Dec. 14, 1965  D. NICOLACI  3,223,432
MOBILE CARRIAGE WITH VERTICALLY MOVABLE PLATFORM
Filed July 30, 1963
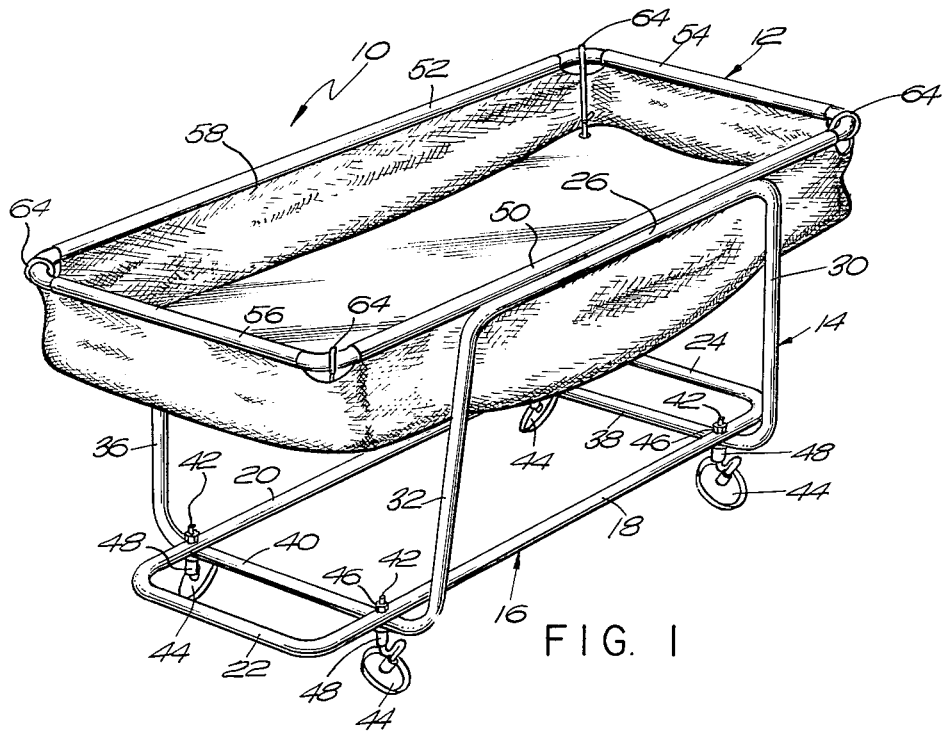
FIG. 1
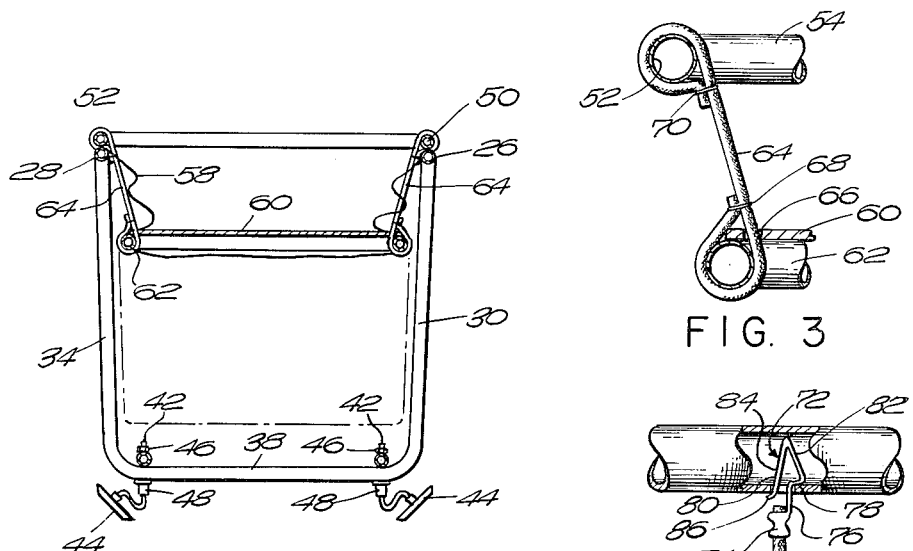
FIG. 2
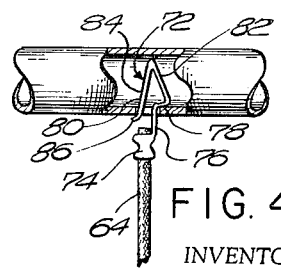
FIG. 3
FIG. 4
INVENTOR.
DOMENICK NICOLACI
BY *Salter & Michaelson*
ATTORNEYS

United States Patent Office

3,223,432
Patented Dec. 14, 1965

3,223,432
MOBILE CARRIAGE WITH VERTICALLY
MOVABLE PLATFORM
Domenick Nicolaci, Fairhaven, Mass., assignor to Cliftex
Clothing Co., Inc., New Bedford, Mass., a corporation
of Massachusetts
Filed July 30, 1963, Ser. No. 298,641
6 Claims. (Cl. 280—79.2)

The present invention relates to a carriage for retaining and dispensing articles therefrom. More particularly, the present invention relates to a mobile carriage in which articles, such as articles of fabric material, are retained therein and are adapted to be maintained at a predetermined working level for the removal from the carriage as desired.

The mobile carriage embodied in the present invention has particular application in the handling of clothing articles, and particularly during the fabrication of the articles to the finished form. Heretofore, piles of fabric have normally been deposited in large container trucks or the like from which they are manually removed by an operator who performs a particular operation thereon in the process of the complete fabrication of the article of clothing. Since the operator may be located in a sitting position, such as at a sewing machine or other similar machine, it is convenient to remove the article of clothing or fabric material from the topmost level of the truck or carriage. As the articles are removed from the truck, it becomes increasingly difficult for the operator to reach the articles since the working level thereof is reduced to a level considerably lower than the topmost portion of the truck. As a result, heretofore the operator had to devote considerable time to reaching for the articles within the truck and removing them for performing the various operations thereon.

The present invention is designed to avoid the attendant difficulties experienced with the heretofore known trucks for use in those shops that manufacture articles of clothing and require the articles to be deposited in a large capacity truck. In order to maintain the uppermost of the articles at a constant level for easy access to the operator of a station at which the articles are located, the truck or carriage embodied in the present invention is provided with a vertically movable platform that is resiliently connected to an upper frame and is responsive to the load of articles thereon to properly maintain the upper level of the articles within easy reach of the operator. The carriage of the present invention has a unique construction that simplified the manufacture thereof and provides a durable and easy-to-handle carriage and has a variable capacity so as to locate a platform at a level that is within easy reach of an operator. Thus articles of clothing or other fabric articles deposited or placed on the platform are always within reach of the operator and may be removed from the platform without resorting to reaching within the carriage to a lower level thereof as was known heretofore.

Accordingly, it is an object of the present invention to provide a mobile carriage for use in the retaining of articles therein wherein the articles are automatically maintained at an upper level for easy removal from the carriage.

Another object is to provide a mobile carriage that is adapted to retain articles formed of fabric material therein and that includes an upper frame to which a flexible basket is secured, the flexible basket including a vertically movable platform that is secured to the upper frame by resilient members that are adapted to maintain the upper frame at a level consistent with the weight of articles thereon.

Still another object is to provide a mobile carriage that includes a flexible container for receiving fabric articles therein and for maintaining the upper level of the articles at the top of the container for the easy removal from the carriage.

Still another object is to provide a mobile container having a vertically movable platform joined to a frame assembly that is defined by a lower frame, an intermediate frame, and an upper frame.

Still another object is to provide a flexible basket for use in a mobile carriage that is interconnected for vertical movement to an upper frame of the carriage by resilient members, the resilient members being secured in place by clip means that in one form of the invention is easily secured or detached from engagement with the upper frame of the carriage.

Other objects, features and advantages of the invention will become apparent as the description thereof proceeds when considered in connection wtih the accompanying illustrative drawings.

In the drawings which illustrate the best mode presently contemplated for carrying out the present invention:

FIG. 1 is a perspective view of the mobile carriage embodied in the present invention;

FIG. 2 is a vertical sectional view of the mobile carriage illustrated in FIG. 1;

FIG. 3 is a fragmentary sectional view showing the interconnection of the movable platform of the carriage to the upper frame thereof; and FIG. 4 is a fragmentary elevational view, with parts shown in section, of a modified form of clip structure for interconnecting the movable platform to the upper frame of the carriage.

Referring now to the drawing and particularly to FIG. 1, the mobile carriage embodied in the present invention is generally indicated at 10, and, as shown, is adapted to retain a plurality of articles formed of a fabric material therein. It is understood, of course, that although the present invention has particular application in the transporting and handling of fabric articles, the concept of the invention may be employed in the handling of articles other than of a fabric material.

As shown in FIG. 1, the mobile carriage 10 includes an upper frame generally indicated at 12, an intermediate frame generally indicated at 14, and a lower frame generally indicated at 16. The lower frame 16 has a generally rectangular configuration and is defined by parallel, longitudinally extending members 18 and 20 that are integrally joined to transversely extending members 22 and 24. The longitudinally and transversely extending members of the lower frame 16 are formed as an integral unit and are preferably fabricated of a tubular material. Joined to the bottom frame 16 is the intermediate frame 14 that includes longitudinally extending upper members 26 and 28 to which are joined vertically extending members 30, 32 and 34, 36. Interconnecting the vertical members 30, 34 of the intermediate frame 14 is a transversely extending member 38. Similarly, a transversely extending member 40 interconnects the vertical members 32, 36. The various members that define the intermediate frame 14, that is, the longitudinal members 26, 28, the vertically extending members 30, 32 and 34, 36, and the transversely extending members 38 and 40 are all joined together as a one-piece frame construction and as described above in connection with the bottom frame 16, the various members of the intermediate frame 14 are adapted to be formed of a tubular material.

The intermediate frame 14 is joined to the bottom frame 16 by the interconnection of the longitudinally extending members 18, 20 of the bottom frame to the laterally or transversely extending members 38 and 40 of the intermediate frame. As will be observed in FIG.

1, the longitudinal members 18, 20 of the bottom frame 16 extend somewhat beyond the transversely extending members 38, 40 of the intermediate frame, the overlapping areas thereof defining a connection point for the bottom and intermediate frames. The overlapping portions of the bottom and intermediate frames are formed with suitable openings that are aligned for receiving a shaft indicated at 42 that is formed as part of a disc-like caster 44. Each of the disc-like casters 44 includes a shank portion 46 that is formed with a reversely turned elbow to which the shank 42 of each caster is joined. The upper end of each shank 42 is threaded for receiving a securing nut 46, a suitable collar 48 being mounted on the shaft 42 below the adjacent transversely extending members 38 or 40 and cooperating with the nut 46 to not only secure the caster 44 in position, but to further secure the bottom and intermediate frames to each other.

The upper frame 12 is joined directly to the intermediate frame 14, and for this purpose, is provided with longitudinally extending members 50, 52 that overlie the longitudinally extending members 26, 28 of the intermediate frame 14. Suitable bolts project through openings formed in the members 26, 50 and 28, 52 for securing these members in close fitting overlying relation. Formed as an integral part of the longitudinal members 50, 52 of the upper frame 12 are transversely extending members 54, 56. As more clearly seen in FIG. 1, the longitudinally extending members 50, 52 of the upper frame 12 extend beyond the vertical members 30, 32 and 34, 36 to define an overhanging structure with respect thereto. It is understood that the members that define the upper frame 12 form a generally rectangular configuration and are fabricated of a tubular material.

Joined to the upper frame 12 and depending therefrom is a flexible basket defined by a net 58 that is formed of a mesh material or the like. The upper edges of the net 58 are secured in some fashion around the members 50, 52 and 54, 56 such as by thread, and the net in the fully extended position thereof is adapted to project approximately the full length of the intermediate frame 14. The bottom of the net 58 is secured to a horizontal platform 60 and a rectangularly shaped frame 62 that is fixed to the underside of the platform 60. The frame 62 on which the platform 60 is secured is disposed between the vertical members 30, 32 and 34, 36 of the intermediate frame 14, while the net 58 also projects between the vertical members of the intermediate frame 14 so that the flexible basket in the fully extended position thereof will be guided between the vertical members of the intermediate frame.

The horizontal platform 60 is adapted to be normally located adjacent the upper level of the mobile carriage and in relatively close proximity to the upper frame 12. For this purpose, a plurality of resilient cord members 64 are provided; and, as shown in FIG. 3, the lowermost end of each of the cord members 64 projects through a suitable opening 66 in the platform 60, extends around the frame 62, and is secured in place by a clip 68. The uppermost end of each of the cord members 64 extends around the upper frame 12 at the junction of the transversely and longitudinally extending members and is secured in place by a clip 70. Although only one of the cord members 64 is illustrated in FIG. 3, it is understood that all of the cord members are constructed similarly and are also similarly joined to their respective portions of the upper frame 12 and the platform 60.

It is seen that the resilient cord members 64 maintain the platform 60 at an upper level in relatively close proximity to the upper frame 12. The cord members 64 are constructed so as to be responsive to weight on the platform 60 for permitting vertical movement of the platform in accordance with the weight thereon. Thus, when the platform is fully loaded with articles formed of fabric material, the platform will be moved downwardly to a lower position thereof adjacent the lower frame 16, as illustrated in doted lines in FIG. 2. As the articles are removed from the platform, the cord members 64 act to raise the platform 60 so as to maintain the upper level of articles thereon adjacent the upper frame 12 for ready access thereto. When all of the articles have been removed from the platform, the platform assumes the position as illustrated in FIGS. 1 and 3. It will be observed that the flexible basket as defined by the net 58 and platform 60 is constructed so as to provide for haphazard arrangement of the fabric articles therein. Thus the flexible net 58 will conform to the unsymmetrical pile of fabric articles as they are placed on the platform 60. The vertical members 30, 32 and 34, 36 of the intermediate frame 14 act to restrict the pile of articles on the platform to some degree and will help confine the articles within the flexible basket.

It is contemplated to secure the cord members 64 in place for easy removal if it is so desired. For this purpose, a modified form of clip may be employed; and, as illustrated in FIG. 4, such a clip generally indicated at 72. The clip 72 is secured to a clamp 74 that is clinched to the uppermost end of a cord member 64. The clip 72 is defined by a short vertically extending portion 76 that is joined directly to the clamp 74. The vertically extending portion 76 is joined to a bent portion 78 that defines means by which the clip 72 is secured in place within an opening 80 of one of the tubular members of the upper frame 12. Joined to the bent portion 78 is an inclined portion 82 to which a spring element 84 is joined. A finger grip 86 is defined at the lowermost end of the spring element 84 and is adapted to be engaged for inserting the clip 72 in position or releasing it therefrom. As seen in FIG. 4, the clip 72 is inserted in position by depressing the spring element 84 through the finger portion 86. The depressed clip is then inserted through the opening 80 in a tubular member of the upper frame 12 and the element 84 is then released. The portion 78 snaps within the tubular member for engagement therein and thus prevents withdrawal of the clip 72 through the opening 80. It is seen that the clip 72 may be quickly and easily inserted in position when it is so desired or removed therefrom as the situation demands.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In a mobile carriage for retaining and dispensing articles, a frame assembly defined by a lower frame having a substantially rectangular configuration to which casters are operatively connected, an intermediate frame having spaced substantially vertical members that are interconnected by transversely extending bottom members and longitudinally extending upper members, said transverse bottom members being secured to longitudinally extending portions of said rectangular bottom frame, and an upper frame having a substantially rectangular configuration and including transverse members and longitudinally extending members that are secured in overlying relation to the longitudinal members of said intermediate frame, said longitudinally extending members of said upper frame extending beyond the vertical members of said intermediate frame to define an overhang with respect thereto, a flexible basket secured to said upper frame and depending therefrom, a movable platform fixed to the bottom of said flexible basket, a rectangular platform frame located between the vertical members of said intermediate frame, said platform being secured to said platform frame on the uppermost side thereof and movable therewith in a vertical direction, a plurality of resilient elements interconnected to said platform and to said upper frame for normally positioning said platform adjacent the upper end of said frame assembly, openings being formed in said platform adjacent to the corners thereof, the lower ends of said resilient elements extending through said openings and being secured to said platform frame, said platform being responsive to the weight of articles thereon for moving downwardly against the biasing action of said resilient elements to increase the capacity of said basket, and means for securing said resilient elements to said platform and to said upper frame.

2. In a mobile carriage as set forth in claim 1, the transverse and longitudinal members of said upper frame being tubular in construction, and said means for securing said resilient elements to said upper frame including clips that project into the tubular members of said upper frame for interlocking engagement therein.

3. In a carriage for use in the handling of articles formed of a fabric material, a lower frame, an upper frame vertically spaced from said lower frame and being disposed generally parallel with respect thereto, an intermediate frame including spaced longitudinally extending members that are joined to said upper frame, spaced transversely extending members that are joined to said lower frame and substantially vertical members that interconnect said longitudinal and transverse members, said longitudinally extending members of said upper frame extending beyond the vertical members of said intermediate frame to define an overhang with respect thereto, a flexible net secured to said upper frame and depending therefrom, a horizontally disposed platform fixed to the lower end of said flexible net and located between said vertical members in parallel relation with respect to said upper and lower frames, and a plurality of resilient elements secured to said platform for normally urging said platform to a position adjacent the upper end of said carriage, said platform being responsive to the weight of the articles located thereon for movement in a vertical direction, wherein articles located on said platform are always accessible at the uppermost end of said carriage.

4. In a carriage for use in the handling of articles formed of a fabric material, a lower frame having a substantially rectangular configuration and being located in a substantially horizontal plane, an upper frame having a substantially rectangular configuration and being spaced vertically above said lower frame in parallel relation with respect thereto, an intermediate frame interconnecting said upper and lower frames and including spaced upper horizontal longitudinally extending members that are secured to longitudinally extending portions of said upper frame, spaced lower horizontal, transversely extending members that are secured to longitudinally extending portions of said lower frame and spaced vertical members that are joined to said longitudinally and transversely extending members of the intermediate frame, said longitudinally extending members of said upper and lower frames extending beyond the vertical members of said intermediate frame in overhanging relation with respect thereto, and a flexible basket secured to said upper frame and depending therefrom, said flexible basket including a movable platform that is mounted for vertical movement in response to the weight of articles placed thereon, resilient means secured to said platform and said upper frame for mounting said platform for vertical movement, and a rectangular platform frame located between the vertical members of said intermediate frame, said platform being secured to said platform frame and being movable therewith in a vertical direction.

5. In a carriage as set forth in claim 4, clip means for securing said resilient means to said platform and said upper frame, the clip means for securing said resilient means to said upper frame including a spring clip that projects through an opening in a portion of said upper frame for securement therein.

6. In a carriage as set forth in claim 4, at least the portions that define said upper frame being formed of a tubular material, said resilient means including a plurality of elongated elastic cords, one end of each cord being secured to said platform and the other end thereof being secured to clip means, said clip means including a spring clip that projects through an opening in a portion of said tubular upper frame for securement therein.

References Cited by the Examiner

UNITED STATES PATENTS

| | | | |
|---|---|---|---|
| D. 163,094 | 5/1951 | Connor. | |
| 1,298,842 | 4/1919 | Wetmore | 24—215 |
| 1,718,277 | 6/1929 | Crowell | 220—93 |
| 2,030,349 | 2/1936 | Bradley | 220—93 |
| 2,468,115 | 4/1949 | Saul. | |
| 2,589,847 | 3/1952 | Noelting et al. | 16—18 |
| 2,785,725 | 3/1957 | Gold | 150—51 |
| 3,031,092 | 4/1962 | Maskel | 220—93 X |

FOREIGN PATENTS

| | | |
|---|---|---|
| 148,481 | 10/1952 | Australia. |
| 884,372 | 12/1961 | Great Britain. |

A. HARRY LEVY, *Primary Examiner.*